2,965,502

PROCESS FOR MAKING PELLETS FROM FIG MATERIAL AND FLOUR

Ross J. Connelly, Ossining, N.Y., assignor to S. M. Wolff Company, New York, N.Y., a corporation of New York No Drawing. Filed June 19, 1958, Ser. No. 743,028

5 Claims. (Cl. 99—204)

The present invention relates to improvements in food products and processes for making the same.

Preparation of ground figs for use in food products has presented considerable difficulty in the past, particularly in connection with their treatment to retard deterioration and at the same time prepare the material in a form readily adaptable for use in food products. This invention overcomes the foregoing difficulties and provides an improved fig product and method of manufacturing ground figs that is economical and produces a stable product in convenient form for incorporation into food products.

Another object of the invention resides in the provision of an improved process for producing pellets from figs and the like.

A further object resides in the provision of improved fig-based pellets suitable for use in baked products such as muffins, cakes, and the like.

A further object resides in the provision of pellets of the above nature composed of a high preponderance of ground whole fig material characterized by their resistance to deterioration, ease of handling in packing, shipping and use, flavor even after extended storage and high moisture absorbing quality when mixed with dough, batter or other similar carrier material.

Another object resides in the provision of an improved method for processing figs and the like that can be quickly and easily carried out to produce fig pellets that are stable, relatively dry and adapted for use in flavoring food products.

Other objects and advantages will appear during the course of the following description of the invention in preferred form and procedure.

Ground figs are used for the preparation of a wide variety of food products though perhaps their major use is in connection with bakery products. In any event it is important that the figs retain uniformly pleasant consistency, freshness of flavor, and the full nutritional values of the original fruit.

At the present time ground figs are generally packed in bulk and sealed in suitable containers in an effort to preserve the freshness of the fruit and increase storage time. This procedure is not only relatively expensive but the bulk fig material is inconvenient to use particularly in bakery products such as muffins and the like. With this invention the figs are prepared in an improved manner and form which retains the qualities of the original fruit and is more readily adaptable for use in bakery and other food products.

According to the invention whole figs are first rolled or tumbled in flour until they acquire a coating constituting approximately the proportion of one part of flour to 97 parts of fig by weight. Suitable flours include wheat flour, rice flour, soy bean flour, corn flour, and starch to which has been added 3% of tri-calcium phosphate. For convenience in the description the term "flour" will be used to identify the family of materials represented by these enumerated flours and starches.

The coated figs are next moved to a suitable grinder. At this stage a second part of flour is added, and the combination of substantially 97 parts fig and 2 parts flour is ground to a state of homogeneity.

Following grinding, the mixture is formed into strips, as by rolling or extrusion, and the strips are deposited in trays. At this stage a third part of flour is dusted or otherwise applied to the tacky surfaces of the strips to which it then adheres, the juices of the mixture working outward sufficiently to form a binder. By this means a thin shell or coating is formed which is composed predominantly of flour. The strips are then thoroughly dried, as by air drying or other suitable means for a suitable length of time dependent on the chosen dimensions of the strips. Typical air drying times may be from one to two weeks.

In a final operation, the dried strips are fed through a chopping machine of any well-known type, where they are cut into short lengths or pellets, the relatively firm outer coating of the strips promoting clean cuts by resisting any tendency to crumble or collapse. Dependent on the particular intended use of the pellets, the latter may be cut in any desired lengths such as 3/16", 1/4", or 3/8", and similarly, the cross-sectional dimensions of the strips obviously may be chosen in accordance with the desired size of pellet.

From the above description, it will be evident that the process provides pellets having a high degree of uniformity, convenience for use, and stability in dry storage over extended periods of time. Having been made from the whole fruit, the pellets in their substantially dehydrated state retain all the fruit's flavoring and nutritional elements. When the dry pellets are mixed in batter, dough or the like, they re-absorb moisture therefrom so as to appear in the baked article with maximum qualities of taste and consistency.

To meet differing requirements of the consumer, variations can be made in the details of the process as described. For example, the grinding may be set to retain fig seeds whole or to reduce them to any desired degree of fineness, and obviously variations may be made in the choice of flour type and exact proportion. Thus, while the invention has been set forth in preferred embodiment, it is not limited to the precise forms described for illustration, as various modifications may be made without departing from the scope of the appended claims.

What is claimed is:

1. That process of making pellets composed of a largely predominant component of fig material and a small component of flour, which includes the steps of coating whole figs with a part of said flour component, grinding said coated figs and a second part of said flour component to a substantially homogeneous mixture, forming said mixture into strips, applying a third and last part of said flour component to said strips, drying said strips, and dividing said strips into pre-determined pellet lengths.

2. A process according to claim 1 wherein said flour component consists of grain flour.

3. A process according to claim 1 wherein said flour component consists of bean flour.

4. A process according to claim 1 wherein said flour component consists of powdered starch with an admixture of substantially 3 percent of tri-calcium phosphate.

5. The process of making a fig product composed of a largely predominant component of fig material and a small component of finely divided edible flour which includes the steps of initially grinding edible flour coated figs, continuing said grinding while adding a second component of flour to form a substantially homogenous mixture, forming said mixture into separate portions, applying a last component of said flour to said portions, then drying said portions.

(References on following page)

References Cited in the file of this patent

UNITED STATES PATENTS

| | | |
|---|---|---|
| 1,018,462 | Warner | Feb. 27, 1912 |
| 1,355,731 | Bloch | Oct. 12, 1920 |
| 2,157,485 | Forkner | May 9, 1939 |

OTHER REFERENCES

"Uses and Application of Chemicals and Related Materials," by Gregory, 1944, volume II, page 334.

"The Joy of Cooking," 1953, by Rombauca et al., pp. 664 and 665.